United States Patent
Yang et al.

(10) Patent No.: US 8,731,115 B2
(45) Date of Patent: May 20, 2014

(54) SYSTEMS AND METHODS FOR DATA PROCESSING INCLUDING PRE-EQUALIZER NOISE SUPPRESSION

(75) Inventors: Shaohua Yang, Santa Clara, CA (US); Jin Lu, Lafayette, CO (US)

(73) Assignee: LSI Corporation, San Jose, CA (US)

( * ) Notice: Subject to any disclaimer, the term of this patent is extended or adjusted under 35 U.S.C. 154(b) by 132 days.

(21) Appl. No.: 13/415,326

(22) Filed: Mar. 8, 2012

(65) Prior Publication Data
US 2013/0235920 A1 Sep. 12, 2013

(51) Int. Cl.
*H04L 27/06* (2006.01)
*H03K 5/159* (2006.01)

(52) U.S. Cl.
USPC .......................................... 375/341; 375/229

(58) Field of Classification Search
USPC ......... 375/341, 229, 232, 233, 316, 345, 346, 375/350; 708/322, 323; 360/31, 75
See application file for complete search history.

(56) References Cited

U.S. PATENT DOCUMENTS

| | | | |
|---|---|---|---|
| 4,553,221 A | 11/1985 | Hyatt | |
| 5,278,703 A | 1/1994 | Rub et al. | |
| 5,278,846 A | 1/1994 | Okayama | |
| 5,317,472 A | 5/1994 | Schweitzer, III | |
| 5,325,402 A | 6/1994 | Ushirokawa | |
| 5,392,299 A | 2/1995 | Rhines | |
| 5,417,500 A | 5/1995 | Martinie | |
| 5,513,192 A | 4/1996 | Janku | |
| 5,523,903 A | 6/1996 | Hetzler | |
| 5,550,810 A | 8/1996 | Monogioudis et al. | |
| 5,550,870 A | 8/1996 | Blaker | |
| 5,612,964 A | 3/1997 | Haraszti | |
| 5,710,784 A | 1/1998 | Kindred | |
| 5,717,706 A | 2/1998 | Ikeda | |
| 5,802,118 A | 9/1998 | Bliss | |
| 5,844,945 A | 12/1998 | Nam | |
| 5,898,710 A | 4/1999 | Amrany | |
| 5,923,713 A | 7/1999 | Hatakeyama | |
| 5,978,414 A | 11/1999 | Nara | |
| 5,983,383 A | 11/1999 | Wolf | |

(Continued)

FOREIGN PATENT DOCUMENTS

| | | | |
|---|---|---|---|
| JP | 2001/319433 A | 11/2001 | |
| WO | WO 2010/059264 A1 | 5/2010 | |

OTHER PUBLICATIONS

U.S. Appl. No. 13/426,714, filed Mar. 22, 2012, Shaohua Yang.

(Continued)

*Primary Examiner* — Khai Tran
(74) *Attorney, Agent, or Firm* — Hamilton DeSanctis & Cha (57) ABSTRACT

The present inventions are related to systems and methods for pre-equalizer noise suppression in a data processing system. As an example, a data processing system is discussed that includes: a sample averaging circuit, a selector circuit, an equalizer circuit, and a mark detector circuit. The sample averaging circuit is operable to average corresponding data samples from at least a first read of a codeword and a second read of the codeword to yield an averaged output based at least in part on a framing signal. The selector circuit is operable to select one of the averaged output and the first read of the codeword as a selected output. The equalizer circuit is operable to equalize the selected output to yield an equalized output, and the mark detector circuit is operable to identify a location mark in the equalized output to yield the framing signal.

20 Claims, 5 Drawing Sheets

(56) References Cited

U.S. PATENT DOCUMENTS

| | | | |
|---|---|---|---|
| 6,005,897 | A | 12/1999 | Mccalissister |
| 6,023,783 | A | 2/2000 | Divsalar |
| 6,029,264 | A | 2/2000 | Kobayashi |
| 6,065,149 | A | 5/2000 | Yamanaka |
| 6,097,764 | A | 8/2000 | McCallister |
| 6,145,110 | A | 11/2000 | Khayrallah |
| 6,216,249 | B1 | 4/2001 | Bliss |
| 6,216,251 | B1 | 4/2001 | McGinn |
| 6,266,795 | B1 | 7/2001 | Wei |
| 6,317,472 | B1 | 11/2001 | Choi |
| 6,351,832 | B1 | 2/2002 | Wei |
| 6,377,610 | B1 | 4/2002 | Hagenauer |
| 6,381,726 | B1 | 4/2002 | Weng |
| 6,412,088 | B1 | 6/2002 | Patapoutian et al. |
| 6,473,878 | B1 | 10/2002 | Wei |
| 6,535,553 | B1 | 3/2003 | Limberg et al. |
| 6,625,775 | B1 | 9/2003 | Kim |
| 6,748,034 | B2 | 6/2004 | Hattori |
| 6,757,862 | B1 | 6/2004 | Marianetti, II |
| 6,785,863 | B2 | 8/2004 | Blankenship |
| 6,810,502 | B2 | 10/2004 | Eidson |
| 6,970,511 | B1 | 11/2005 | Barnette |
| 6,986,098 | B2 | 1/2006 | Poeppelman |
| 7,047,474 | B2 | 5/2006 | Rhee |
| 7,058,873 | B2 | 6/2006 | Song |
| 7,073,118 | B2 | 7/2006 | Greenberg |
| 7,093,179 | B2 | 8/2006 | Shea |
| 7,117,427 | B2 | 10/2006 | Ophir |
| 7,133,228 | B2 | 11/2006 | Fung |
| 7,136,244 | B1 | 11/2006 | Rothberg |
| 7,184,486 | B1 | 2/2007 | Wu |
| 7,191,378 | B2 | 3/2007 | Eroz |
| 7,203,887 | B2 | 4/2007 | Eroz |
| 7,308,061 | B1 | 12/2007 | Huang |
| 7,310,768 | B2 | 12/2007 | Eidson |
| 7,313,750 | B1 | 12/2007 | Feng |
| 7,370,258 | B2 | 5/2008 | Iancu |
| 7,415,651 | B2 | 8/2008 | Argon |
| 7,502,189 | B2 | 3/2009 | Sawaguchi |
| 7,523,375 | B2 | 4/2009 | Spencer |
| 7,587,657 | B2 | 9/2009 | Haratsch |
| 7,590,168 | B2 | 9/2009 | Raghavan |
| 7,596,196 | B1 | 9/2009 | Liu et al. |
| 7,646,829 | B2 | 1/2010 | Ashley |
| 7,702,986 | B2 | 4/2010 | Bjerke |
| 7,752,523 | B1 | 7/2010 | Chaichanavong |
| 7,779,325 | B2 | 8/2010 | Song |
| 7,802,172 | B2 | 9/2010 | Casado |
| 7,952,824 | B2 | 5/2011 | Dziak |
| 7,958,425 | B2 | 6/2011 | Chugg |
| 7,996,746 | B2 | 8/2011 | Livshitz |
| 8,018,360 | B2 | 9/2011 | Nayak |
| 8,161,361 | B1 | 4/2012 | Song et al. |
| 8,201,051 | B2 | 6/2012 | Tan |
| 8,237,597 | B2 | 8/2012 | Liu |
| 8,261,171 | B2 | 9/2012 | Annampedu |
| 8,291,284 | B2 | 10/2012 | Savin |
| 8,291,299 | B2 | 10/2012 | Li |
| 8,295,001 | B2 | 10/2012 | Liu |
| 2003/0147168 | A1 | 8/2003 | Galbraith et al. |
| 2006/0002689 | A1 | 1/2006 | Yang et al. |
| 2008/0069373 | A1 | 3/2008 | Jiang |
| 2008/0304558 | A1 | 12/2008 | Zhu et al. |
| 2009/0132893 | A1 | 5/2009 | Miyazaki |
| 2009/0185643 | A1 | 7/2009 | Fitzpatrick |
| 2010/0172046 | A1 | 7/2010 | Liu et al. |
| 2011/0043938 | A1* | 2/2011 | Mathew et al. ............ 360/31 |
| 2011/0167227 | A1 | 7/2011 | Yang |
| 2011/0264987 | A1 | 10/2011 | Li |
| 2012/0038998 | A1* | 2/2012 | Mathew et al. ............ 360/75 |
| 2012/0124118 | A1 | 5/2012 | Ivkovic |
| 2012/0182643 | A1 | 7/2012 | Zhang |
| 2012/0207201 | A1 | 8/2012 | Xia |
| 2012/0212849 | A1 | 8/2012 | Xu |
| 2012/0262814 | A1 | 10/2012 | Li |
| 2012/0265488 | A1 | 10/2012 | Sun |

OTHER PUBLICATIONS

Patapoutian et al "Improving Re-Read Strategies by Waveform Averaging" IEEE Transactions on Mag. vol. 37 No. 6, Nov. 2001.

Xiao, et al "Nested Codes with Multiple Interpretations" retrieved from the Internet URL: Http://www.ece.nmsu.edu/~jkliewer/paper/XFKC_CISS06 (retrieved Dec. 5, 2012).

Casado et al., Multiple-rate low-density parity-check codes with constant blocklength, IEEE Transactions on communications, Jan. 2009, vol. 57, pp. 75-83.

Cui et al., "High-Throughput Layered LDPC Decoding Architecture", IEEE Transactions on Very Large Scale Integration (VLSI) Systems, vol. 17, No. 4 (Apr. 2009).

Fan et al., "Constrained coding techniques for soft iterative decoders" Proc. IEEE Global Telecommun. Conf., vol. 1b, pp. 631-637 (1999).

Fossorier, Marc P.C. "Quasi-Cyclic Low-Density Parity-Check Codes From Circulant Permutation Maricies" IEEE Transactions on Information Theory, vol. 50, No. 8 Aug. 8, 2004.

Gross, "Stochastic Decoding of LDPC Codes over GF(q)", HDPCC Workshop, Tel Aviv (Mar. 2, 2010).

Gunnam et al., "VLSI Architectures for Layered Decoding for Irregular LDPC Codes of WiMax", IEEE ICC Proceedings (2007).

Hagenauer, J. et al A Viterbi Algorithm with Soft-Decision Outputs and its Applications in Proc. IEEE Globecom, pp. 47. 11-47 Dallas, TX Nov. 1989.

Han and Ryan, "Pinning Techniques for Low-Floor Detection/Decoding of LDPC-Coded Partial Response Channels", 5th International Symposium on Turbo Codes &Related Topics, 2008.

Kautz, "Fibonacci Codes for Synchronization Control", IEEE Trans. Info. Theory, vol. 11, No. 2, pp. 284-292 (Apr. 1965).

Kschischang et al., "Factor Graphs and the Sum-Product Algorithm", IEEE Transactions on Information Theory, vol. 47, No. 2 (Feb. 2001).

Leduc-Primeau et al., "A Relaxed Half-Stochastic Iterative Decoder for LDPC Codes", IEEE Communications Society, IEEE Globecom proceedings (2009).

Lee et al., "Partial Zero-Forcing Adaptive MMSE Receiver for DS-CDMA Uplink in Multicell Environments" IEEE Transactions on Vehicular Tech. vol. 51, No. 5, Sep. 2002.

Li et al "Efficient Encoding of Quasi-Cyclic Low-Density Parity Check Codes" IEEE Transactions on Communications on 53 (11) 1973-1973, 2005.

Lim et al. "Convergence Analysis of Constrained Joint Adaptation in Recording Channels" IEEE Trans. on Signal Processing vol. 54, No. 1 Jan. 2006.

Lin et al "An efficient VLSI Architecture for non binary LDPC decoders"—IEEE Transaction on Circuits and Systems II vol. 57, Issue 1 (Jan. 2010) pp. 51-55.

Moon et al, "Pattern-dependent noise prediction in signal-dependent Noise," IEEE JSAC, vol. 19, No. 4 pp. 730-743, Apr. 2001.

Moon et al., "Maximum transition run codes for data storage systems", IEEE Trans. Magn., vol. 32, No. 5, pp. 3992-3994 (Sep. 1996).

Shokrollahi "LDPC Codes: An Introduction", Digital Fountain, Inc. (Apr. 2, 2003).

Spagnol et al, "Hardware Implementation of GF(2Am) LDPC Decoders", IEEE Transactions on Circuits and Systemssi: Regular Papers, vol. 56, No. 12 (Dec. 2009).

Tehrani et al., "Fully Parallel Stochastic LDPC Decoders", IEEE Transactions on Signal Processing, vol. 56, No. 11 (Nov. 2008).

Todd et al., "Enforcing maximum-transition-run code constraints and low-density parity check decoding", IEEE Trans. Magn., vol. 40, No. 6, pp. 3566-3571 (Nov. 2004).

U.S. Appl. No. 13/284,730, filed Oct. 28, 2011, Fan Zhang, Unpublished.

U.S. Appl. No. 13/295,150, filed Nov. 14, 2011, Zongwang Li, Unpublished.

U.S. Appl. No. 13/284,767, filed Oct. 28, 2011, Fan Zhang, Unpublished.

U.S. Appl. No. 13/269,832, filed Oct. 10, 2011, Haitao Xia, Unpublished.

(56) References Cited

OTHER PUBLICATIONS

U.S. Appl. No. 13/227,544, filed Sep. 8, 2011, Shaohua Yang, Unpublished.
U.S. Appl. No. 13/239,683, filed Sep. 22, 2011, Changyou Xu, Unpublished.
U.S. Appl. No. 13/186,234, filed Jul. 19, 2011, Haitao Xia, Unpublished.
U.S. Appl. No. 13/213,751, filed Aug. 19, 2011, Fan Zhang, Unpublished.
U.S. Appl. No. 13/369,468, filed Feb. 9, 2012, Zongwang Li, Unpublished.
U.S. Appl. No. 13/180,495, filed Jul. 11, 2011, Chung-Li Wang, Unpublished.
U.S. Appl. No. 13/340,951, filed Dec. 30, 2011, Lei Chen, Unpublished.
U.S. Appl. No. 13/300,078, filed Nov. 18, 2011, Chung-Li Wang, Unpublished.
U.S. Appl. No. 13/302,119, filed Nov. 22, 2011, Lei Chen, Unpublished.
U.S. Appl. No. 13/305,510, filed Nov. 28, 2011, Lei Chen, Unpublished.
U.S. Appl. No. 13/227,416, filed Sep. 7, 2011, Lei Chen, Unpublished.
U.S. Appl. No. 13/305,551, filed Nov. 28, 2011, Yang Han, Unpublished.
U.S. Appl. No. 13/296,022, filed Nov. 14, 2011, Victor Krachkovsky, Unpublished.
U.S. Appl. No. 13/174,537, filed Jun. 30, 2011, Anantha Raman Krishnan, Unpublished.
U.S. Appl. No. 13/174,453, filed Jun. 30, 2011, Johnson Yen, Unpublished.
U.S. Appl. No. 13/283,549, filed Oct. 27, 2011, Wu Chang, Unpublished.
U.S. Appl. No. 13/171,615, filed Jun. 29, 2011, Bradley D. Seago, Unpublished.
U.S. Appl. No. 13/269,852, filed Oct. 10, 2011, Haitao Xia, Unpublished.
U.S. Appl. No. 13/113,219, filed May 23, 2011, Yang Han, Unpublished.
U.S. Appl. No. 13/372,580, filed Feb. 14, 2012, Fan Zhang, Unpublished.
U.S. Appl. No. 13/412,520, filed Mar. 5, 2012, Fan Zhang, Unpublished.
U.S. Appl. No. 13/362,409, filed Jan. 31, 2012, Fan Zhang, Unpublished.
U.S. Appl. No. 13/316,858, filed Dec. 12, 2011, Zongwang Li, Unpublished.
U.S. Appl. No. 13/316,741, filed Dec. 12, 2011, Yang Han, Unpublished.
U.S. Appl. No. 13/327,279, filed Dec. 15, 2011, Wei Feng, Unpublished.
U.S. Appl. No. 13/340,974, filed Dec. 30, 2011, Dan Liu, Unpublished.
Vasic, B., "High-Rate Low-Density Parity-Check Codes Based on Anti-Pasch Affine Geometries," Proc ICC 2002, pp. 1332-1336.
Vasic, B., "High-Rate Girth-Eight Codes on Rectangular Integer Lattices", IEEE Trans. Communications, vol. 52, Aug. 2004, pp. 1248-1252.
Weon-Cheol Lee et al., "Vitierbi Decoding Method Using Channel State Info. in COFDM System" IEEE Trans. on Consumer Elect., IEEE Service Center, NY, NY vol. 45, No. 3 Aug. 1999.
Xiao, et al "Nested Codes With Multiple Interpretations" retrieved from the Internet URL: http://www.ece.nmsu.edu/~jkliewer/paper/XFKC_CISS06.pdf (retrieved on Dec. 5, 201.
Yeo et al., "VLSI Architecture for Iterative Decoders in Magnetic Storage Channels", Mar. 2001, pp. 748-755, IEEE trans. Magnetics, vol. 37, No. 2.
Zhang et al., "Analysis of Verification-Based Decoding on the q-ary Symmetric Channel for Large q", IEEE Trans. on Information Theory, vol. 57, No. 10 (Oct. 2011).
Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.
Zhong et al., "Joint Code-Encoder Design for LDPC Coding System VLSI Implementation", ISCAS, IEEE pp. 389-392, May 2004.
Zhong et al., "High-Rate Quasi-Cyclic LDPC Codes for Magnetic Recording Channel with Low Error Floor", ISCAS, IEEE pp. 3546-3549, May 2006.
Zhong et al., "Design of VLSI Implementation-Oriented LDPC Codes", IEEE, pp. 670-673, 2003.
Zhong, "Block-LDPC: A Practical LDPC Coding System Design Approach", IEEE Trans. on Circuits, Regular Papers, vol. 5, No. 4, pp. 766-775, Apr. 2005.

* cited by examiner

SYSTEMS AND METHODS FOR DATA PROCESSING INCLUDING PRE-EQUALIZER NOISE SUPPRESSION

BACKGROUND OF THE INVENTION

The present inventions are related to systems and methods for data processing, and more particularly to systems and methods for noise suppression in a data processing system.

Various data transfer systems have been developed including storage systems, cellular telephone systems, radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function uses a variable number of iterations through a data detector circuit and/or data decoder circuit depending upon the characteristics of the data being processed. In a typical scenario data that is processed is first equalized and one or more noise filtering techniques are applied. In such cases, however, noise may adversely affect upstream processing including parameter selection such that the ability for the processing to converge on an originally written data set is undermined.

Hence, for at least the aforementioned reasons, there exists a need in the art for advanced systems and methods for data processing.

BRIEF SUMMARY OF THE INVENTION

The present inventions are related to systems and methods for data processing, and more particularly to systems and methods for noise suppression in a data processing system.

Various embodiments of the present invention provide data processing systems. The data processing systems include a sample averaging circuit, a selector circuit, an equalizer circuit, and a mark detector circuit. The sample averaging circuit is operable to average corresponding data samples from at least a first read of a codeword and a second read of the codeword to yield an averaged output based at least in part on a framing signal. The selector circuit is operable to select one of the averaged output and the first read of the codeword as a selected output. The equalizer circuit is operable to equalize the selected output to yield an equalized output, and the mark detector circuit is operable to identify a location mark in the equalized output to yield the framing signal. In some instances of the aforementioned embodiments, the data processing system is implemented as part of an integrated circuit. In various instances of the aforementioned embodiments, the data processing system is implemented in a storage device.

In some instances of the aforementioned embodiments, the sample averaging circuit includes: an alignment buffer operable to store the second read of the codeword; an averaging buffer operable to store an averaged output incorporating the first read of the codeword; and an average circuit operable to align and average the averaged output and the second read of the codeword to yield an updated averaged output that is stored to the averaging buffer. In various instances of the aforementioned embodiments, the data processing system further includes: a data processing circuit operable to process the equalized output to yield a processed output; and a retry control circuit operable to cause a retry condition to occur based at least in part on an error in processed output. In some such instances, the selector circuit is operable to select the averaged output as the selected output when the retry condition occurs. In some cases, the data processing system further includes a re-read control circuit operable to cause the first codeword and the second codeword to be derived from the same region of a storage medium when the retry condition occurs. In one or more cases, operation of the equalizer circuit is governed at least in part based on a target input. In such cases, the data processing system may further include a target adaptation circuit operable to adaptively modify the target input. In one such case, the adaptive modification of the target input is performed only when the retry condition occurs. In one or more instances, the data processing circuit includes: a data detector circuit operable to apply a data detection algorithm to the equalized output to yield a detected output; and a data decoder circuit operable to apply a data decode algorithm to a decoder input derived from the detected output to yield a decoded output. In such instances, the processed output is derived from the decoded output.

Other embodiments of the present invention provide methods for data processing that include: receiving a first data set corresponding to a first instance of a codeword; receiving a second data set corresponding to a second instance of the codeword; averaging at least the first data set and the second data set on a sample by sample basis to yield an averaged output; selecting one of the second data set and the averaged data set as a selected data set; and equalizing the selected data set using an equalizer circuit to yield an equalized output. In some instances of the aforementioned embodiments, equalizing the selected data set is governed at least in part based on a target input. In such instances, the method may further include adaptively modifying the target input. In one or more instances of the aforementioned embodiments, averaging at least the first data set and the second data set includes aligning corresponding samples in the first data set and the second data set, and averaging the corresponding samples.

In some instances of the aforementioned embodiments, the methods further include processing the equalized output to yield a processed output, and triggering a retry condition based at least in part on an error in the processed output. In one or more cases, selecting one of the second data set and the averaged data set as a selected data set includes selecting the averaged data set when the retry condition is triggered. In some cases, equalizing the selected data set is governed at least in part based on a target input, and the methods further include adaptively modifying the target input when the retry condition is triggered. In particular cases, processing the equalized output includes: applying a data detection algorithm to the equalized output to yield a detected output; and applying a data decode algorithm to a decoder input derived from the detected output to yield a decoded output. In such cases, the processed output is derived from the decoded output.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference

DETAILED DESCRIPTION OF THE INVENTION

The present inventions are related to systems and methods for data processing, and more particularly to systems and methods for noise suppression in a data processing system.

Various embodiments of the present invention provide for data processing that includes pre-equalization noise suppression. Such pre-equalization noise suppression reduces noise in a signal received by an equalizer circuit such that the effectiveness of target adaptation for the equalizer circuit is enhanced.

Figure 1:
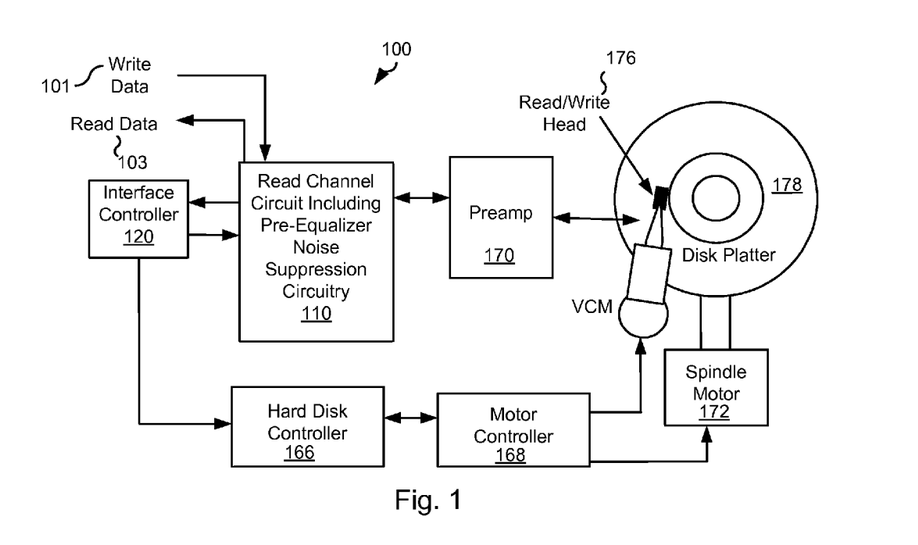
FIG. 1 shows a storage system including pre-equalizer noise suppression circuitry in accordance with various embodiments of the present invention.

Turning to FIG. 1, a storage system 100 including a read channel circuit 110 having pre-equalizer noise suppression circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

As part of processing the received information, read channel circuit 110 occasionally is unable to recover the originally written data set. In such cases, a retry condition may be triggered causing the read/write head assembly 176 to repeatedly pass over the same target area to that the unrecovered data set may be read and re-read from disk platter 178. Each time the data set is read and re-read it is converted from an analog signal to a series of corresponding digital samples with the digital samples being stored to an alignment buffer (not shown). The digital samples are also provided to an equalizer circuit (not shown) that provides an equalized output to a sync mark detector circuit (not shown). The sync mark detector circuit identifies the beginning of a codeword within the received data and provides an alignment signal to an averaging circuit (not shown). The averaging circuit aligns the digital samples stored in the alignment buffer with averaged data in an averaging buffer (not shown) and causes the digital samples to be averaged with corresponding instances of averaged data in the averaging buffer to yield an updated averaged data that is stored back to the averaging buffer. This process of averaging suppresses noise in the data set that is being read and re-read. The averaged data from the averaging buffer is then equalized by the equalizer circuit and processed through a data processing circuit. Such an approach allows for a target adaptation circuit associated with the equalizer circuit to be re-adapted using data that has been noise filtered, thereby enhancing the effectiveness of the target adaptation process. In some cases, read channel circuit 110 may be implemented to include a data processing circuit similar to that discussed below in relation to FIG. 2 and/or FIGS. 3a-3b. Further, the data processing including the averaging process may be accomplished consistent with one of the approaches discussed below in relation to FIGS. 4a-4b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Figure 2:
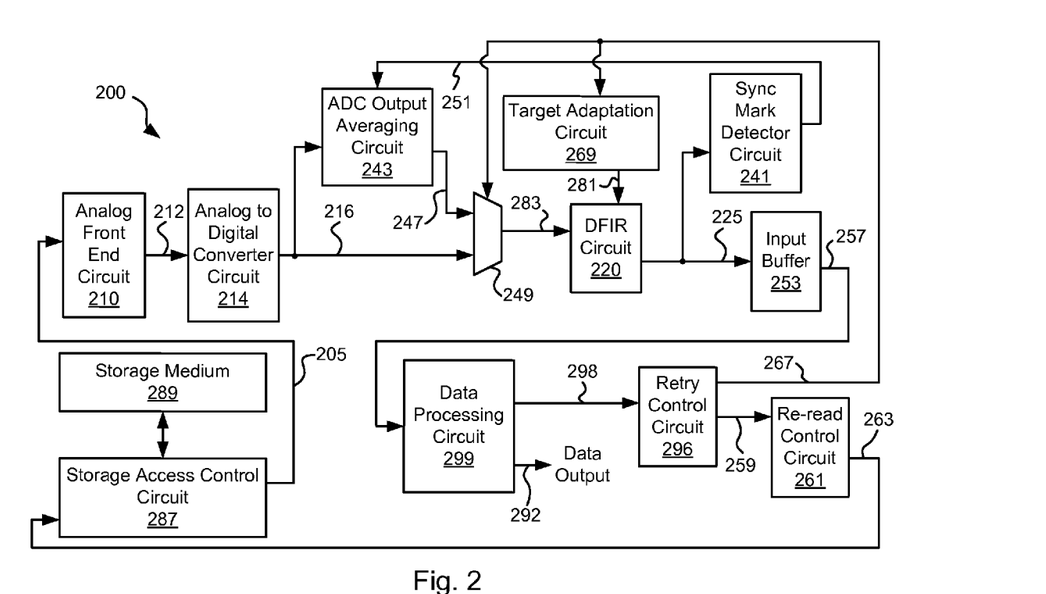
FIG. 2 depicts a data processing system including pre-equalizer noise suppression circuitry in accordance with some embodiments of the present invention.

Turning to FIG. 2, a data processing system 200 including pre-equalizer noise suppression circuitry is shown in accordance with some embodiments of the present invention. Data processing system 200 includes an analog front end circuit 210 that receives an analog input signal 205 from a storage access control circuit 287. Storage access control circuit 287 is operable to govern access of data from a storage medium 289, and to provide the accessed data as analog input signal 205. Storage medium 289 may be a variety of different storage media including, but not limited to, a magnetic disk platter, a magnetic tape, or an optical disk. Based upon the disclosure provided herein, one of ordinary skill in the art will recognize a variety of media that may be used as storage medium 289 in accordance with different embodiments of the present invention. Storage access control circuit 287 may be any circuit known in the art for controlling access to a storage medium. Based upon the disclosure provided herein, one of ordinary skill in the art will recognize a variety of control circuits that may be used in relation to different embodiments of the present invention.

Analog input signal 205 is provided to an analog front end circuit 210 that processes analog input signal 205 and provides a processed analog signal 212 to an analog to digital converter circuit 214. Analog front end circuit 210 may include, but is not limited to, an analog filter and an amplifier circuit as are known in the art. Based upon the disclosure provided herein, one of ordinary skill in the art will recognize a variety of circuitry that may be included as part of analog front end circuit 210. Analog to digital converter circuit 214 converts processed analog signal 212 into a corresponding series of digital samples 216. Analog to digital converter circuit 214 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 216 are provided to an ADC Output averaging circuit 243 and a selector circuit 249. ADC output averaging circuit 243 averages a number of corresponding instances of digital samples 216 across multiple accesses of analog input signal 205 such that noise exhibited by analog input signal 205 is reduced. The alignment of the currently received digital samples 216 with a resulting averaged output 247 is done in accordance with framing signals 251. Averaged output 247 is provided to selector circuit 249.

Selector circuit 249 provides one of resulting averaged output 247 or digital samples 216 as a selected input 283 based upon an assertion level of a selector control 267. In some embodiments of the present invention, selector circuit 249 is a multiplexer circuit. Based upon the disclosure provided herein, one of ordinary skill in the art will recognize a variety of selector circuits that may be used in relation to different embodiments of the present invention. Selected input 283 is provided to an equalizer circuit 220.

Equalizer circuit 220 applies an equalization algorithm governed by a target input 281 to digital samples 283 to yield an equalized output 225. In some embodiments of the present invention, equalizer circuit 220 is a digital finite impulse response filter circuit as are known in the art. Equalized output 225 is provided to a sync mark detector circuit 241 that is operable to identify one or more location marks within a received data streams. These one or more location marks are provided as framing signals 251 to ADC output averaging circuit 243. In one particular embodiment of the present invention, sync mark detector circuit 241 is operable to identify a synchronization mark indicating the beginning of a codeword within equalized output 225 and an end of file mark indicating the end of the codeword. The synchronization mark and the end of file mark are provided as framing signals. In another particular embodiment of the present invention, sync mark detector circuit 241 is operable to identify a synchronization mark indicating the beginning of a codeword within equalized output 225 and to count a defined number of samples from the synchronization mark before asserting an end of file mark. Based upon the disclosure provided herein, one of ordinary skill in the art will recognize a variety of signals that may be identified within equalized output 225 by sync mark detector circuit 241 and/or generated by sync mark detector circuit 241 and provided as framing signals 251 to ADC output averaging circuit 243.

In addition, equalized output 225 is stored to an input buffer 253 that includes sufficient memory to maintain one or more codewords until processing of that codeword is completed through a data processing circuit 299 completes. Data processing circuit 299 may be any circuit known in the art for applying one or more algorithms to recover originally written data. A processing output 257 is pulled from input buffer 253 and provided to data processing circuit 299 when a codeword is available as processing output 257 and data processing circuit 299 is available to process the codeword. Where the processing of the codeword by data processing circuit 299 completes without errors, a resulting data output 292 is provided to a recipient. Alternatively, where the processing of the codeword fails to yield the originally written data, an error signal 298 is provided to a retry control circuit 296. Retry control circuit 296 determines whether another attempt to recover the failed codeword is desired. In some cases, retry control circuit 296 always attempts recovery. In other cases, retry control circuit 296 only attempts recovery upon meeting a certain condition such as, for example, sufficient available bandwidth to attempt the recovery or a relatively high priority of the failed codeword. Based upon the disclosure provided herein, one of ordinary skill in the art will recognize a variety of scenarios where recovery is called for, and/or a variety of retry control circuits that may be used in relation to different embodiments of the present invention.

Where retry control circuit 296 indicates a retry is desired, a retry enable signal 267 is asserted such that selector circuit 249 selects averaged output 247 as selected input 283, and to enable updating of target input 281 by a target adaptation circuit 269. Target adaptation circuit 269 may be any circuit known in the art that is capable of adaptively modifying a target value provided to a filter circuit. In one embodiment of the present invention, target adaptation circuit 269 operates by adjusting target input 281 provided to equalizer circuit 220 to reduce an error between equalized output 225 and an ideal output (not shown). Based upon the disclosure provided herein, one of ordinary skill in the art will recognize a variety of implementations of target adaptation circuit that may be used in relation to different embodiments of the present invention.

In addition, where retry control circuit 296 indicates a retry is desired, a re-read signal 259 is asserted to a re-read control circuit 261. Re-read control circuit 261 repeatedly provides the same read address 263 to storage access control circuit 287 such that storage access control circuit 287 causes a repeated re-read of the same region of storage medium 289. This results in the same analog input signal 205 being repeatedly generated, and averaging of the repeatedly generated digital samples 216 by ADC averaging circuit 243. This repeated averaging across multiple reads of the same region of storage medium 289 operates to average out noise evident in any given access.

In operation, a region of storage medium 289 is accessed resulting in a corresponding analog input signal 205. As this is the first attempt at recovering originally written data embodied as analog input signal 205, retry enable signal 267 is not asserted such that selector circuit 249 selects digital samples 216 as selected input 283. Where the processing performed on selected input 283 is able to converge on the originally written data set, data output 292 is provided that includes the recovered data, and no change in the assertion level of retry enable signal 267 results. Alternatively, where the processing of selected input 283 fails to converge on the originally written data set, retry control circuit 296 asserts retry enable signal 267 such that selector circuit 249 selects averaged output 247 as selected input 283, and the same region of storage medium 289 is read and re-read. As each of the re-reads are performed, more and more instances of the codeword represented by analog input signal 205 are averaged together on a sample by sample basis thereby reducing noise occurring in any given read. As averaged output 247 is processed, target adaptation circuit 269 re-adapts target input 281 enhancing the operation of equalizer 220 and providing an increased probability of recovering the previously unrecovered data set.

Figure 3A:
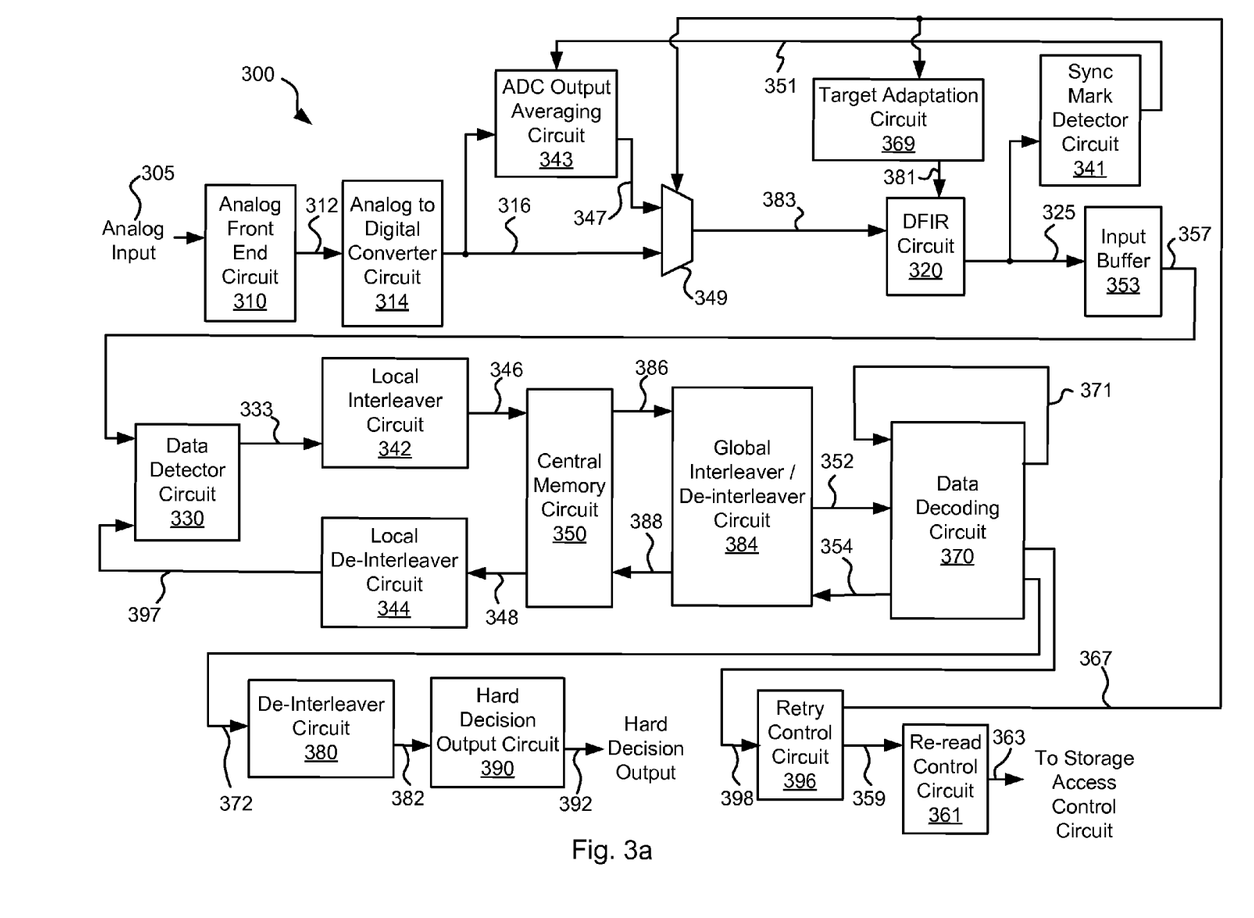
FIG. 3a-3c shows one particular implementation of the data processing system of FIG. 2 in accordance with some embodiments of the present invention.

Turning to FIG. 3a data processing circuit 300 including pre-equalizer noise suppression circuitry is shown in accordance with some embodiments of the present invention. Data processing system 300 includes an analog front end circuit 310 that receives an analog input signal 305 derived from a storage medium (not shown) under direction of a storage access control circuit (not shown). Analog front end circuit 310 processes analog input signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an ADC Output averaging circuit 343 and a selector circuit 349. ADC output averaging circuit 343 averages a number of corresponding instances of digital samples 316 across multiple accesses of analog input signal 305 such that noise exhibited by analog input signal 305 is reduced. The alignment of the currently received digital samples 316 with a resulting averaged output 347 is done in accordance with framing signals 351. Averaged output 347 is provided to selector circuit 349.

Selector circuit 349 provides one of resulting averaged output 347 or digital samples 316 as a selected input 383 based upon an assertion level of a selector control 367. In some embodiments of the present invention, selector circuit 349 is a multiplexer circuit. Based upon the disclosure provided herein, one of ordinary skill in the art will recognize a variety of selector circuits that may be used in relation to different embodiments of the present invention. Selected input 383 is provided to an equalizer circuit 320.

Equalizer circuit 320 applies an equalization algorithm governed by a target input 381 to digital samples 383 to yield an equalized output 325. In some embodiments of the present invention, equalizer circuit 320 is a digital finite impulse response filter circuit as are known in the art. Equalized output 325 is provided to a sync mark detector circuit 341 that is operable to identify one or more location marks within a received data streams. These one or more location marks are provided as framing signals 351 to ADC output averaging circuit 343. In one particular embodiment of the present invention, sync mark detector circuit 341 is operable to identify a synchronization mark indicating the beginning of a codeword within equalized output 325 and an end of file mark indicating the end of the codeword. The synchronization mark and the end of file mark are provided as framing signals. In another particular embodiment of the present invention, sync mark detector circuit 341 is operable to identify a synchronization mark indicating the beginning of a codeword within equalized output 325 and to count a defined number of samples from the synchronization mark before asserting an end of file mark. Based upon the disclosure provided herein, one of ordinary skill in the art will recognize a variety of signals that may be identified within equalized output 325 by sync mark detector circuit 341 and/or generated by sync mark detector circuit 341 and provided as framing signals 351 to ADC output averaging circuit 343.

In addition, equalized output 325 is stored to an input buffer 353 that includes sufficient memory to maintain one or more codewords until processing of that codeword is completed through a data processing circuit 399 completes. Data processing circuit 399 may be any circuit known in the art for applying one or more algorithms to recover originally written data. A processing output 357 is pulled from input buffer 353. Input buffer 353 includes sufficient memory to maintain one or more codewords until processing of that codeword is completed through a data detector circuit 330 and a data decoding circuit 370 including, where warranted, multiple global iterations (passes through both data detector circuit 330 and data decoding circuit 370) and/or local iterations (passes through data decoding circuit 370 during a given global iteration). A processing output 357 is provided to data detector circuit 330.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. In some embodiments of the present invention, data detector circuit 330 is a Viterbi algorithm data detector circuit as are known in the art. In other embodiments of the present invention, data detector circuit 330 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Upon completion of application of the data detection algorithm to the received codeword on the first global iteration, data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once data decoding circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into data decoding circuit 370. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. Data decoding circuit 370 applies a data decode algorithm to decoder input 352 to yield a decoded output 371. In cases where another local iteration (i.e., another pass trough data decoder circuit 370) is desired, data decoding circuit 370 re-applies the data decode algorithm to decoder input 352 guided by decoded output 371. This continues until either a maximum number of local iterations is exceeded or decoded output 371 converges.

Where decoded output 371 fails to converge (i.e., fails to yield the originally written data set) and a number of local iterations through data decoder circuit 370 exceeds a threshold and another global iteration through both data detector circuit 330 and data decoder circuit 370 is allowed, the resulting decoded output is provided as a decoded output 354 back to central memory circuit 350 where it is stored awaiting another global iteration through a data detector circuit included in data detector circuit 330. Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 accessed from central memory circuit 350 and locally de-interleaved by a de-interleaver circuit 344. De-interleaver circuit 344 re-arranges decoder output 348 to reverse the shuffling originally performed by interleaver circuit 342. A resulting de-interleaved output 397 is provided to data detector circuit 330 where it is used to guide subsequent detection of a corresponding data set previously received as equalized output 325.

Alternatively, where the decoded output converges (i.e., yields the originally written data set), the resulting decoded output is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order. The originally ordered data sets are then provided as a hard decision output 392.

As yet another alternative, where decoded output 371 fails to converge (i.e., fails to yield the originally written data set) and a number of local iterations through data decoder circuit 370 exceeds a threshold and another global iteration through both data detector circuit 330 and data decoder circuit 370 is not allowed, an error signal 398 is provided to a retry control circuit 396. Retry control circuit 396 determines whether another attempt to recover the failed codeword is desired. In some cases, retry control circuit 396 always attempts recovery. In other cases, retry control circuit 396 only attempts recovery upon meeting a certain condition such as, for example, sufficient available bandwidth to attempt the recovery or a relatively high priority of the failed codeword. Based upon the disclosure provided herein, one of ordinary skill in the art will recognize a variety of scenarios where recovery is called for, and/or a variety of retry control circuits that may be used in relation to different embodiments of the present invention.

Where retry control circuit 396 indicates a retry is desired, a retry enable signal 367 is asserted such that selector circuit 349 selects averaged output 347 as selected input 383, and to enable updating of target input 381 by a target adaptation circuit 369. Target adaptation circuit 369 may be any circuit known in the art that is capable of adaptively modifying a target value provided to a filter circuit. In one embodiment of the present invention, target adaptation circuit 369 operates by adjusting target input 381 provided to equalizer circuit 320 to reduce an error between equalized output 325 and an ideal output (not shown). Based upon the disclosure provided herein, one of ordinary skill in the art will recognize a variety of implementations of target adaptation circuit that may be used in relation to different embodiments of the present invention.

In addition, where retry control circuit 396 indicates a retry is desired, a re-read signal 359 is asserted to a re-read control circuit 361. Re-read control circuit 361 repeatedly provides the same read address 363 to a storage access control circuit (not shown) such that the storage access control circuit causes a repeated re-read of the same region of a storage medium (not shown). This results in the same analog input signal 305 being repeatedly generated, and averaging of the repeatedly generated digital samples 316 by ADC averaging circuit 343. This repeated averaging across multiple reads of the same region of storage medium 389 operates to average out noise evident in any given access.

In operation, a region of storage medium 389 is accessed resulting in a corresponding analog input signal 305. As this is the first attempt at recovering originally written data embodied as analog input signal 305, retry enable signal 367 is not asserted such that selector circuit 349 selects digital samples 316 as selected input 383. Where the processing performed on selected input 383 is able to converge on the originally written data set, data output 392 is provided that includes the recovered data, and no change in the assertion level of retry enable signal 367 results. Alternatively, where the processing of selected input 383 fails to converge on the originally written data set, retry control circuit 396 asserts retry enable signal 367 such that selector circuit 349 selects averaged output 347 as selected input 383, and the same region of storage medium 389 is read and re-read. As each of the re-reads are performed, more and more instances of the codeword represented by analog input signal 305 are averaged together on a sample by sample basis thereby reducing noise occurring in any given read. As averaged output 347 is processed, target adaptation circuit 369 re-adapts target input 381 enhancing the operation of equalizer 320 and providing an increased probability of recovering the previously unrecovered data set.

Figure 3B:
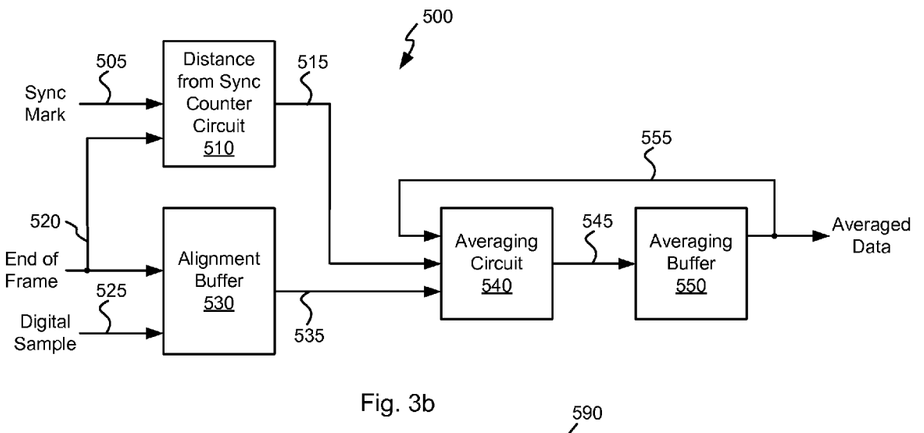
Figure 3C:
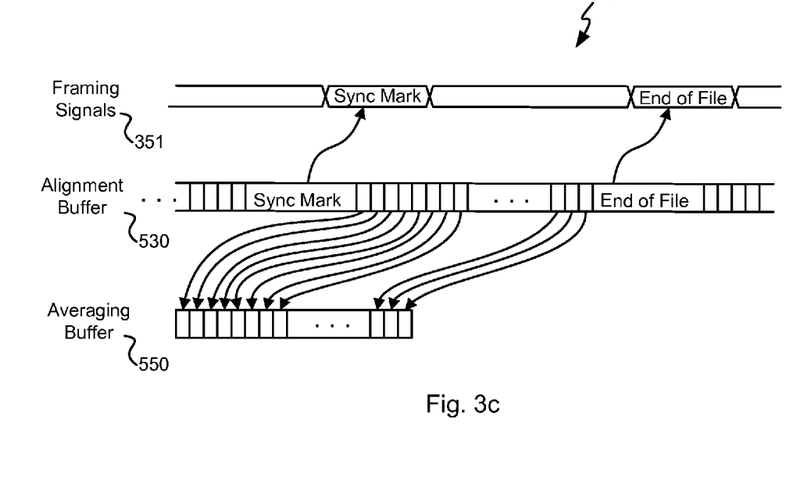

Turning to FIG. 3b, an example implementation 500 of ADC output averaging circuit 343 is shown in accordance with one or more embodiments of the present invention. Implementation includes a counter circuit 510 that is reset each time an end of frame 520 is received and is incremented until a sync mark 505 is received. Thus, once sync mark 505 is received, a count value 515 indicates a number of samples from end of frame 520 to sync mark 505. Digital samples 525 are stored to an alignment buffer 530 as they are received at an address that begins at a defined address each time an end of frame 520 is received and is incremented as each additional sample is received. An alignment buffer output 535 is provided to an averaging circuit 540. Averaging circuit 540 uses count value 515 as an offset into alignment buffer 530 to select respective samples a defined offset from sync mark 505. The instance of alignment buffer output 535 a count value 515 from the beginning of alignment buffer 530 corresponds to a first averaged sample in an averaging buffer 550 with each subsequent instance of alignment buffer output 535 being a corresponding distance into averaging buffer 550. Averaging circuit 540 is operable to average alignment buffer output 535 with corresponding instances of an averaged data 555 on a sample by sample basis. FIG. 3c is an example timing diagram showing an alignment of alignment buffer 530 including sync mark and end of frame references with corresponding locations in averaging buffer 550. Of note, framing signals 351 are shown in relation to data stored in alignment buffer 530.

Figure 4A:
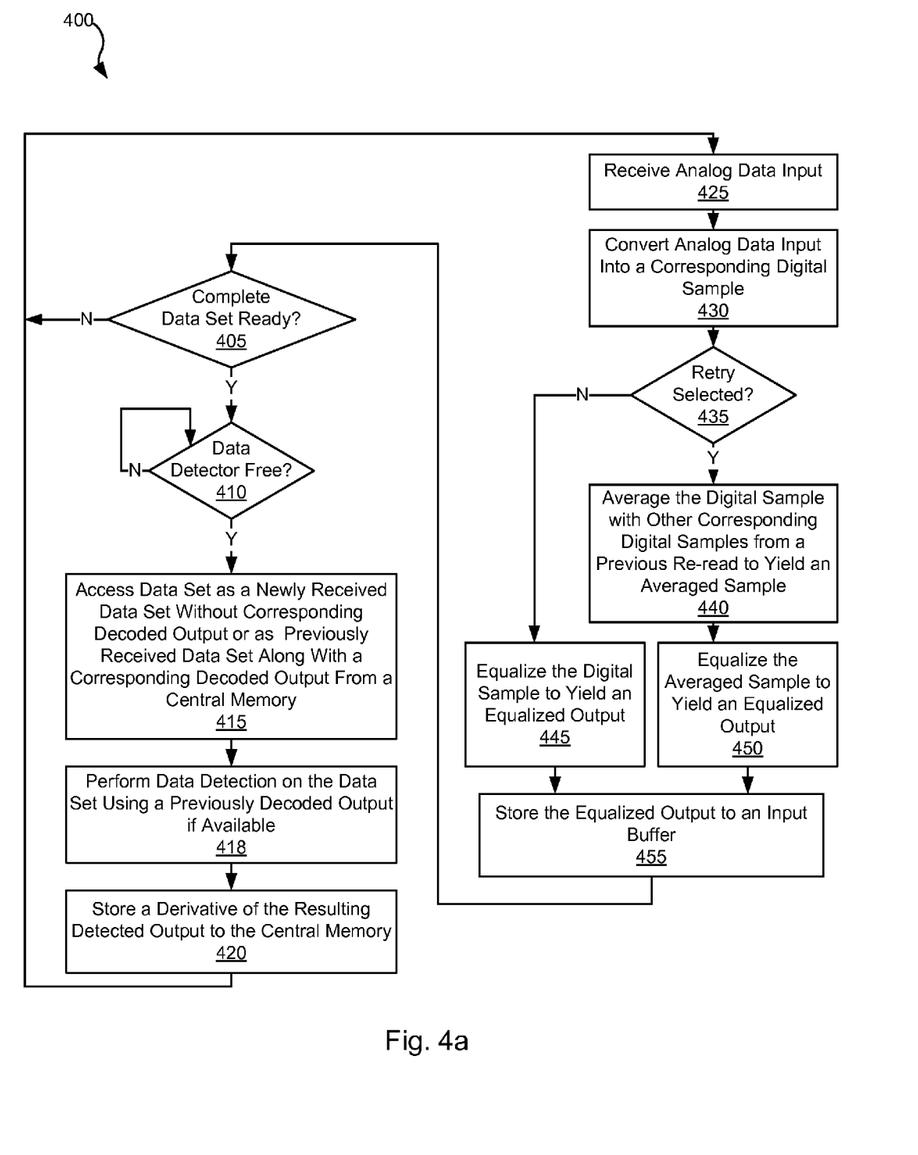
FIGS. 4a-4b are flow diagrams showing a method for data processing including pre-equalization noise suppression in accordance with some embodiments of the present invention.
Figure 4B:
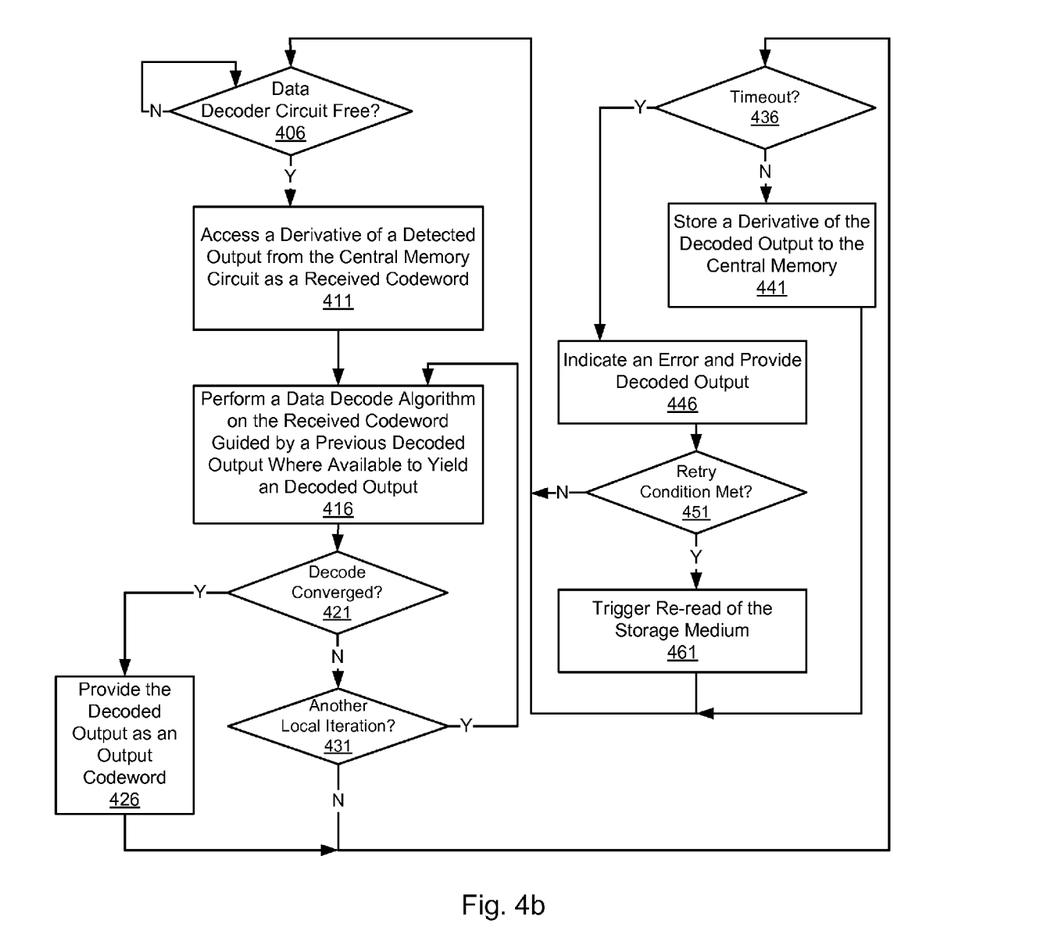

Turning to FIGS. 4a-4b, flow diagrams 400, 401 showing a method for data processing including pre-equalization noise suppression in accordance with some embodiments of the present invention. Following flow diagram 400, an analog data input is received (block 425). The analog input is derived from a storage medium. The received analog data input is converted into a series of corresponding digital samples (block 430). It is determined whether a retry condition is selected (block 435) (see block 461 of FIG. 4b). Where a retry condition is selected (block 435), the currently received digital sample is averaged with other corresponding digital samples from preceding reads to yield an averaged sample (block 440). The averaged sample is then equalized to yield an equalized output (block 450). Alternatively, where a retry condition is not selected (block 435), the currently received digital sample is equalized to yield an equalized output (block 445). In either case, the equalized output is stored to an input buffer (block 455).

It is repeatedly determined whether a data set is ready in the input buffer for processing (block 405). A data set may become ready for processing where either the data set was previously processed and a data decode has completed in relation to the data set and the respective decoded output is available in a central memory from block 441, or where a previously unprocessed data set becomes available in the input buffer from block 455. Where a data set is ready (block 405), it is determined whether a data detector circuit is available to process the data set (block 410).

Where the data detector circuit is available for processing (block 410), the available data set is accessed (block 415). Where the data set is a newly received data set (i.e., form block 455), it is accessed without a corresponding decoded output. Alternatively, where the data set was previously received and is on its second or later global iteration, a corresponding decoded output from the central memory is also accessed. A data detection is performed on the data set using the previously decoded output as a guide where it is available (block 418). In some cases, the data detection algorithm is a Viterbi algorithm data detector circuit or a maximum a posteriori data detector circuit. A derivative of he resulting detected output is then stored to the central memory (block 420). The derivative of the detected output may be, for example, an interleaved or shuffled version of the detected output.

Turning to FIG. 4b, a flow diagram 401 shows a counterpart of the method described above in relation to FIG. 4a. Following flow diagram 401, in parallel to the previously described data detection process of FIG. 4a, it is determined whether a data decoder circuit is available (block 406). The data decoder circuit may be, for example, a low density data decoder circuit as are known in the art. Where the data decoder circuit is available (block 406), the previously stored derivative of a detected output is accessed from the central memory and used as a received codeword (block 411). A data decode algorithm is applied to the received codeword to yield a decoded output (block 416). Where a previous local iteration has been performed on the received codeword, the results of the previous local iteration (i.e., a previous decoded output) are used to guide application of the decode algorithm. It is then determined whether the decoded output converged (i.e., resulted in the originally written data) (block 421). Where the decoded output converged (block 421), it is provided as an output codeword (block 426). Alternatively, where the decoded output failed to converge (block 421), it is determined whether another local iteration is desired (block 431). In some cases, four local iterations are allowed per each global iteration. Based upon the disclosure provided herein, one of ordinary skill in the art will recognize another number of local iterations that may be used in relation to different embodiments of the present invention. Where another local iteration is desired (block 431), the processes of blocks 416-431 are repeated for the codeword. Alternatively, where another local iteration is not desired (block 431), it is determined whether a timeout condition has been met (block 436). Such a timeout condition may be triggered when the particular codeword has used too many processing cycles and must yield to other processing codewords. Where a timeout condition has not been triggered, a derivative of the decoded output is stored to the central memory (block 441). The derivative of the decoded output being stored to the central memory triggers the data set ready query of block 405 to begin the data detection process.

Alternatively, where the timeout condition is met (block 436), the currently processing codeword is kicked out of the system by indicating an error and providing the codeword in its present error state (block 446). It is determined whether a retry for the failed codeword is to be performed (block 451). In some embodiments of the present invention, the retry is always performed. In other embodiments, the retry is conditioned on, for example, sufficient bandwidth to perform the retry and/or a priority of the failed codeword. Where a retry condition is not met (block 451), standard processing continues with the next available codeword. Alternatively, where the retry condition is met (block 451), adaptation of the equalization target is enabled (block 456), a re-read of the storage medium is triggered to cause multiple reads of the region of the storage medium corresponding to the failed codeword (block 461).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for power governance. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
    a sample averaging circuit operable to average corresponding data samples from at least a first read of a codeword and a second read of the codeword to yield an averaged output based at least in part on a framing signal;
    a selector circuit operable to select one of the averaged output and the first read of the codeword as a selected output;
    an equalizer circuit operable to equalize the selected output to yield an equalized output; and
    a mark detector circuit operable to identify a location mark in the equalized output to yield the framing signal.

2. The data processing system of claim 1, wherein the sample averaging circuit comprises:
    an alignment buffer operable to store the second read of the codeword;
    an averaging buffer operable to store an averaged output incorporating the first read of the codeword; and
    an average circuit operable to align and average the averaged output and the second read of the codeword to yield an updated averaged output that is stored to the averaging buffer.

3. The data processing system of claim 1, wherein the data processing system further comprises:
    a data processing circuit operable to process the equalized output to yield a processed output; and
    a retry control circuit operable to cause a retry condition to occur based at least in part on an error in processed output.

4. The data processing system of claim 3, wherein the selector circuit is operable to select the averaged output as the selected output when the retry condition occurs.

5. The data processing system of claim 4, wherein the data processing system further comprises:
    a re-read control circuit operable to cause the first codeword and the second codeword to be derived from the same region of a storage medium when the retry condition occurs.

6. The data processing system of claim 3, wherein operation of the equalizer circuit is governed at least in part based on a target input, and wherein the data processing system further comprises:
    a target adaptation circuit operable to adaptively modify the target input.

7. The data processing system of claim 6, wherein the adaptive modification of the target input is performed only when the retry condition occurs.

8. The data processing system of claim 3, wherein the data processing circuit comprises:
    a data detector circuit operable to apply a data detection algorithm to the equalized output to yield a detected output; and
    a data decoder circuit operable to apply a data decode algorithm to a decoder input derived from the detected output to yield a decoded output, and wherein the processed output is derived from the decoded output.

9. The data processing system of claim 8, wherein the data detector circuit is selected from a group consisting of: a Viterbi algorithm data detector circuit, and a maximum a posteriori data detector circuit.

10. The data processing system of claim 8, wherein the data decoder circuit is a low density parity check decoder circuit.

11. The data processing system of claim 1, wherein the system is implemented as an integrated circuit.

12. The data processing system of claim 1, wherein the data processing system is incorporated in a storage device.

13. A method for data processing, the method comprising:
    receiving a first data set corresponding to a first instance of a codeword;
    receiving a second data set corresponding to a second instance of the codeword;
    averaging at least the first data set and the second data set on a sample by sample basis to yield an averaged output;
    selecting one of the second data set and the averaged data set as a selected data set; and
    equalizing the selected data set using an equalizer circuit to yield an equalized output.

14. The method of claim 13, wherein equalizing the selected data set is governed at least in part based on a target input, and wherein the method further comprises:
    adaptively modifying the target input.

15. The method of claim 13, wherein averaging at least the first data set and the second data set comprises:
    aligning corresponding samples in the first data set and the second data set; and
    averaging the corresponding samples.

16. The method of claim 13, wherein the method further comprises:
    processing the equalized output to yield a processed output; and triggering a retry condition based at least in part on an error in the processed output.

17. The method of claim 16, wherein selecting one of the second data set and the averaged data set as a selected data set includes selecting the averaged data set when the retry condition is triggered.

18. The method of claim 17, wherein equalizing the selected data set is governed at least in part based on a target input, and wherein the method further comprises:
adaptively modifying the target input when the retry condition is triggered.

19. The method of claim 16, wherein processing the equalized output comprises:
applying a data detection algorithm to the equalized output to yield a detected output; and
applying a data decode algorithm to a decoder input derived from the detected output to yield a decoded output, and wherein the processed output is derived from the decoded output.

20. A storage device, the storage device comprising:
a storage medium;
a head assembly disposed in relation to the storage medium and operable to provide a sensed signal corresponding to information on the storage medium;
a read channel circuit including:
an analog to digital converter circuit operable to sample an analog signal derived from the sensed signal to yield a series of digital samples for a first instance of a codeword and a series of digital samples for a second instance of the codeword, wherein the codeword is derive from a particular location on the storage medium;
a sample averaging circuit operable to average corresponding digital samples for the first instance of the codeword and digital samples for the second instance of the codeword to yield an averaged output based at least in part on a framing signal;
a selector circuit operable to select one of the averaged output and the first instance of the codeword as a selected output;
an equalizer circuit operable to equalize the selected output to yield an equalized output; and
a mark detector circuit operable to identify a location mark in the equalized output to yield the framing signal.

* * * * *